United States Patent
Nagarajan et al.

(10) Patent No.: US 8,156,496 B2
(45) Date of Patent: Apr. 10, 2012

(54) DATA PROCESSING SYSTEM AND METHOD

(75) Inventors: Padmanabhan Selvakumarapalayam Nagarajan, Cupertino, CA (US); Ganesh Handige Shankar, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1073 days.

(21) Appl. No.: 12/021,945

(22) Filed: Jan. 29, 2008

(65) Prior Publication Data

US 2008/0184015 A1 Jul. 31, 2008

(30) Foreign Application Priority Data

Jan. 31, 2007 (IN) .............................. 208/CHE/2007

(51) Int. Cl.
 *G06F 9/46* (2006.01)
(52) U.S. Cl. ........................................... 718/102; 718/1

(58) Field of Classification Search .................. None
See application file for complete search history.

(56) References Cited

U.S. PATENT DOCUMENTS

| | | | |
|---|---|---|---|
| 5,317,738 A | 5/1994 | Cochcroft, Jr. et al. | |
| 6,658,654 B1 * | 12/2003 | Berry et al. | 717/131 |
| 8,032,888 B2 * | 10/2011 | Vengerov et al. | 718/102 |
| 2003/0236816 A1 * | 12/2003 | Venkatasubramanian | 709/107 |
| 2004/0064829 A1 | 4/2004 | Pallister et al. | |
| 2005/0081183 A1 * | 4/2005 | Accapadi et al. | 717/100 |
| 2005/0086660 A1 * | 4/2005 | Accapadi et al. | 718/107 |
| 2006/0037017 A1 * | 2/2006 | Accapadi et al. | 718/100 |
| 2006/0064687 A1 * | 3/2006 | Dostert | 718/1 |
| 2007/0067606 A1 * | 3/2007 | Lin et al. | 712/10 |
| 2007/0300231 A1 * | 12/2007 | Aguilar et al. | 718/104 |

* cited by examiner

*Primary Examiner* — Emerson Puente
*Assistant Examiner* — Dong Kim

(57) ABSTRACT

A method of optimizing a thread in a system comprising a plurality of processors, the method comprising: determining performance of the thread on each of the processors; comparing the determined performances; and selecting a processor for executing the thread based on the comparison.

11 Claims, 2 Drawing Sheets

DATA PROCESSING SYSTEM AND METHOD

RELATED APPLICATIONS

This patent application claims priority to Indian patent application serial no. 208/CHE/2007, titled "Data Processing System and Method", filed in India on 31 Jan. 2007, commonly assigned herewith, and hereby incorporated by reference.

BACKGROUND TO THE INVENTION

In a data processing system with multiple processors, an operating system will schedule a thread to execute on a processor that becomes free for executing a thread.

A thread of a program running on the system can be bound to a selected processor. The thread will only be executed by the selected processor. For example, the operating system will only schedule the thread to be executed by the selected processor.

It is an object of embodiments of the invention to at least mitigate one or more of the problems of the prior art.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

Figure 1:
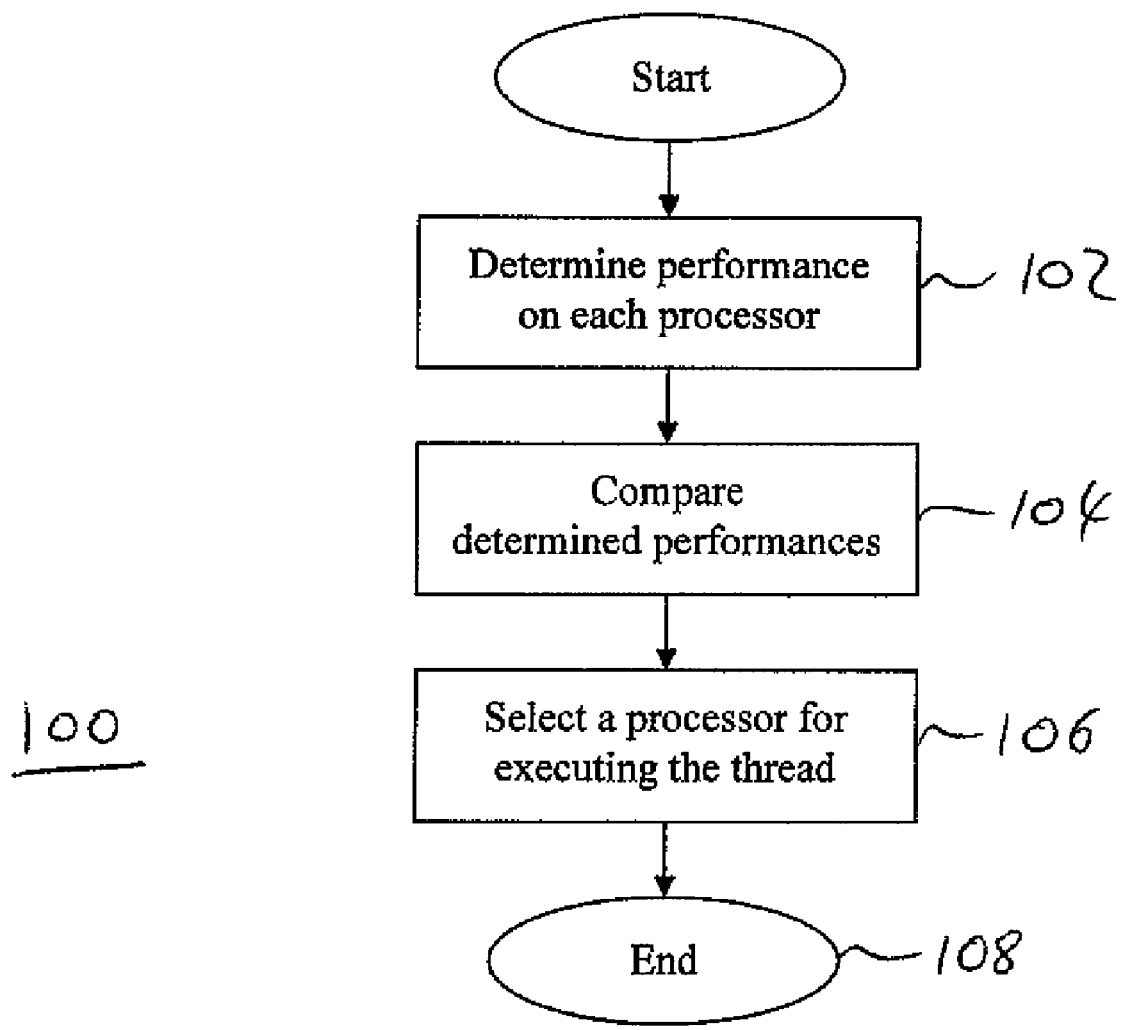
FIG. 1 shows an example of a method of scheduling a thread.

Embodiments of the invention can be used to bind one or more threads for execution on a data processing system having a plurality of processors, such that the threads execute in an efficient manner and/or with high performance. Thus, embodiments of the invention comprise a method of optimizing a thread.

In a system with a plurality of processors (logical and/or physical processors), a thread may execute more efficiently on certain processors. For example, on certain processors, more instructions of a thread may be executed in a given time period and/or the thread may complete its tasks more quickly. The efficiency of a thread when executing on a processor can be affected by a number of factors. For example, in a system with cache-coherent non-uniform memory access (ccNUMA) architecture, the location of a thread's data in memory can affect the efficiency of the thread on the various processors of the system. In a system having a cell-based architecture, where the main memory comprises multiple areas of memory, each of which is associated with a particular processor, where a thread interacts with an area of memory, the thread may execute more efficiently on a processor associated with that area of memory. With any architecture, where a thread must interact with another thread, the threads may execute more efficiently if they are executed by processors that share the same cache and/or main memory. A thread may also execute more efficiently on a processor on which it has previously executed, as the processor's cache may already be populated by at least some of the data used by the thread. Also, in certain systems, a component, such as a network interface card (NIC), may be configured to interrupt a predetermined processor when it receives a data packet, and a thread that processes the data packet may run more efficiently on the predetermined processor than on other processors.

Threads that may benefit from embodiments of the invention (for example, by executing with improved efficiency) include, for example, threads that make heavy use of memory or a processor's cache and/or threads that process packets received by a system component such as, for example, a NIC, although other threads may also benefit from embodiments of the invention.

Where it is desired to improve the efficiency of a thread, embodiments of the invention cause the thread to execute on each of the processors (or selected processors) of the data processing system in turn, and determine the performance of the thread on the processors. Embodiments of the invention may then compare the results from each of the processors, and may cause the thread to execute on a selected processor, such as, for example, the processor that showed the highest performance.

For example, embodiments of the invention bind the thread to each processor in turn, causing the operating system to schedule the thread for execution on each processor in turn, for the performance on each processor to be determined. Then, following the comparison, the thread may be bound to the selected processor so that the operating system only schedules the thread for execution on the selected processor.

Embodiments of the invention may be applied to both a thread that has already begun execution on a data processing system, and a thread that has yet to be executed on a data processing system.

FIG. 1 shows a method 100 of optimizing a thread according to embodiments of the invention, when the thread is running or is to be run on a data processing system having a plurality of data processors. The method starts at step 102, where the performance of the thread when executing on each of the system's processors is determined. That is, the thread is bound to a processor causing the thread to be executed on that processor, and the performance of the thread on that processor is determined. This is then repeated for all of the other processors in the system. However, in certain embodiments, one or more processors may be excluded if, for example, one or more processors are unsuitable for executing the thread, it is known that the thread executes inefficiently on one or more processors, and/or one or more processors are reserved for other uses.

The method then proceeds to step 104, where the determined performances of the thread on the processors of the system are compared with each other. As a result of the comparison in step 104, a processor is selected for executing the thread in step 106. The method then ends at step 108.

The processor selected in step 106 may be the processor on which the thread shows the highest performance when executing, as determined by the comparison in step 104. Therefore, the thread will run more efficiently on this processor than any of the other processors in the data processing system. However, other factors may affect which processor is selected, such that the overall system runs more efficiently Once a thread is selected, the thread may then be bound to the selected processor such that subsequent execution of the thread on the system is carried out by the selected processor.

Embodiments of the invention may use existing tools on the data processing system to carry out the method of scheduling the thread. For example, the system may include the HP-UX operating system. In this case, the pstat( ) tool may be used to determine which processors are present in the system. The mpctl( ) tool may be used to bind the thread to a processor such that it is executed by that processor. Where the processors include, for example, one or more Intel® Itanium® or Itanium® 2 processors, the perfmon( ) tool may be used to extract information from a processor's performance monitoring unit (PMU). Such information may include the information used to determine the performance of the thread on a processor as indicated in more detail below.

Figure 2:
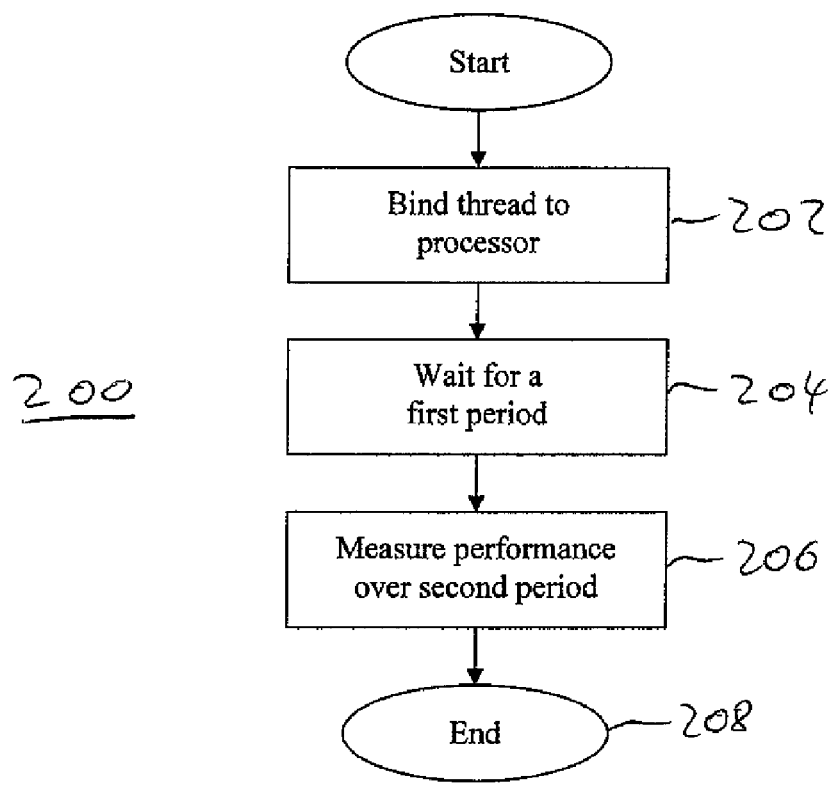
FIG. 2 shows an example of a method of determining performance of a thread on a processor.

FIG. 2 shows an example of a method 200 of determining the performance of a thread on a processor. The method 200 starts at step 202 where the thread is bound to the processor, causing the thread to be executed by the processor. Next, in step 204, the thread is left to execute on the processor for a first period. This is to allow the thread to settle on the processor and for the thread to reach a "steady state" where the initial repopulations of the cache of the processor have substantially completed, and any other initialisations by the processor due to the thread being bound to it have also substantially completed. If the thread is not left to execute for the first period, the subsequent measurements of the performance of the thread on the processor may be inaccurate due to these initialisations by the processor.

Once the first period is over, the performance of the thread is measured over a second period in step 206 of the method 200. For example, the cycles per instruction (CPI) value for the thread being executed by the processor is measured. To do this, the total number of clock cycles of the processor in the second period is measured or determined. The total number of thread instructions executed by the processor in the second period (instructions retired) is also measured or determined. The total number of NOP operations of the thread (NOPs retired) is also measured or determined.

These values may be obtained, for example, from the performance monitoring unit (PMU) of the processor, if applicable.

The first and second periods may be configurable and suitable periods may be determined, for example, by experimentation or by specifying long periods.

The effective cycles per instruction (CPI) value is calculated using the following formula:

$$\text{Effective } CPI = \frac{\text{total clock cycles}}{\text{Instructions retired} - NOPs \text{ retired}}$$

A higher CPI value indicates that a processor requires more clock cycles for executing each instruction. Therefore, where all of the relevant processors of the data processing system have the same or similar clock frequency, a higher CPI value indicates less efficient execution of the thread. The step 104 of comparing the determined performances in the method 100 of FIG. 1 may comprise comparing the effective CPI values to determine, for example, which processor has the lowest CPI value, as this processor will execute the thread more efficiently than other processors in the system.

Although embodiments of the invention use effective CPI as a value of the determined performance of a thread on a processor, other performance measurements may be used in alternative embodiments. Also, in alternative embodiments, data used to determine the performance may be obtained from sources other than a performance monitoring unit (PMU).

Embodiments of the invention may cause the thread to execute with a performance overhead during the method of scheduling the thread. However, this may be offset by the increase in performance and/or efficiency of the thread once the method has selected a processor for executing the thread. Where the thread is to be executed for a considerable length of time, the performance overhead encountered during the scheduling may be negligible compared to the subsequent performance and/or efficiency increase.

Figure 3:
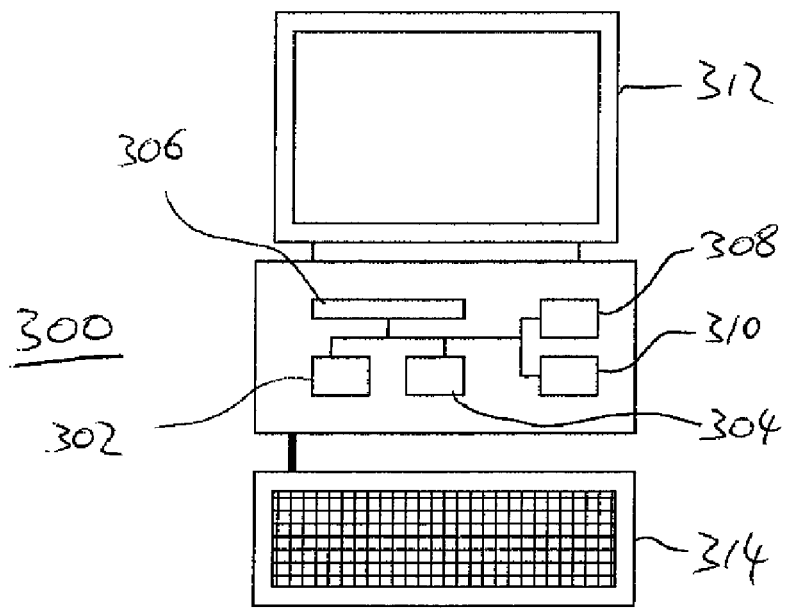
FIG. 3 shows an example of a data processing system having a plurality of processors.

FIG. 3 shows an example of a data processing system 300 suitable for use with embodiments of the invention. The system 300 includes a first processor 302 and a second processor 304. The processors 302 and 304 share a main memory 306. The system 300 may also include a permanent storage device 308, such as, for example, a hard disk, and a communications device 310 that enables the system to communicate with an external wired and/or wireless network such as, for example, a LAN, WAN or the internet. The system 300 may include a display device 312 and an input device 314 such as, for example, a keyboard and/or mouse. The data processing system 300 may omit certain components and/or may include further components. In particular, the system 300 may have more than two processors. The processors in the system 300 may be logically and/or physically distinct.

Embodiments of the invention may be used to enhance performance of one or more threads on both symmetric multiprocessing (SMP) architectures and non-uniform memory access (NUMA) architectures, and any other architectures. Embodiments of the invention may be implemented, for example, as an application running on the data processing system and/or as part of an operating system of the data processing system.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of optimizing a thread in a system comprising a plurality of processors, the method comprising:
    determining performance of the thread on each of the plurality of processors by:
        executing the thread on a first processor for a first period;
        measuring the performance of the thread on the first processor for a second period; and
        repeating executing and measuring of the performance of the thread on each of the remaining processors for subsequent periods;
    comparing the determined performances; and
    selecting one of the plurality of processors for executing the thread based on the comparison.

2. A method as claimed in claim 1, wherein determining the performance of the thread on each of the plurality of processors comprises measuring a cycles per instruction (CPI) value of the thread on each of the plurality of processors.

3. A method as claimed in claim 1, wherein selecting one of the plurality of processors comprises selecting the processor with the highest determined performance.

4. A method as claimed in claim 1, comprising binding the thread to the selected processor for a subsequent execution of the thread.

5. A non-transitory computer readable storage medium having loaded thereon a computer program for optimizing a thread on a system comprising a plurality of processors, the computer program comprising computer readable code to:
    determine performance of the thread on each of the plurality of processors through:
        execution of the thread on a first processor for a first period;
        measurement of the performance of the thread on the first processor for a second period; and
        repetition of execution and measurement of the performance of the thread on each of the remaining processors for subsequent periods;
    compare the determined performances; and
    select one of the plurality of processors for executing the thread based on the comparison.

6. A non-transitory computer readable storage medium as claimed in claim 5, wherein the computer readable code to determine the performance of the thread on each of the plurality of processors comprises computer readable code to measure a cycles per instruction (CPI) value of the thread on each of the plurality of processors.

7. A non-transitory computer readable storage medium as claimed in claim 5, wherein the computer readable code to select one of the plurality of processors comprises computer readable code to select the processor with the highest determined performance.

8. A non-transitory computer readable storage medium as claimed in claim 5, further comprising computer readable code to bind the thread to the selected processor for a subsequent execution of the thread.

9. An apparatus comprising:
    a plurality of processors; and
    a data storage device on which is stored computer readable code to:
        determine performance of the thread on each of the plurality of processors through:
            execution of the thread on a first processor for a first period;
            measurement of the performance of the thread on the first processor for a second period; and
            repetition of execution and measurement of the performance of the thread on each of the remaining processors for subsequent periods;
        compare the determined performances; and
        select one of the plurality of processors of the plurality of processor to execute the thread based on the comparison.

10. The apparatus according to claim 9, wherein the computer readable code to determine the performance of the thread on each of the plurality of processors comprises computer readable code to measure a cycles per instruction (CPI) value of the thread on each of the plurality of processors, and wherein the computer readable code to select the processor comprises computer readable code to select the processor with the highest determined performance.

11. The apparatus according to claim 9, further comprising computer readable code to bind the thread to the selected processor for a subsequent execution of the thread.

* * * * *